Patented Apr. 17, 1934

1,955,044

UNITED STATES PATENT OFFICE 1,955,044

MANUFACTURING TOOLS

Ernst Ammann, Essen, Germany, assignor to Fried. Krupp Aktiengesellschaft, Essen-on-the-Ruhr, Germany No Drawing. Application May 13, 1930, Serial No. 452,147. In Germany November 21, 1929

9 Claims. (Cl. 76—101)

My invention has for its object a process of manufacturing tools by which the field of use of those metal alloys which are built up on the basis of carbides of metals of high melting point (tungsten group) is considerably enlarged. My process primarily consists in melting onto a ground metal, in a layer of desired thickness, preferably by means of a melting flame, powdered metal carbides of high melting point of the tungsten group containing preferably an addition, known per se, of an auxiliary metal of lower melting point such as cobalt, nickel or iron.

The process forming the subject-matter of my invention can be carried out for instance in the following manner:

The metal carbide to be welded onto ground metal is finely powdered and mixed with a flux such as calcium fluoride, and this mixture is applied to the surface of the ground metal piece which has been heated to red heat. Thereupon, beginning from one side the ground metal is melted on its surface by means of a neutral melting flame of a temperature of at least 3000 degrees C., and the metal carbide mass is continually melted into this superficial melting bath by means of the burner. In this operation the lower layers of the carbide mass possibly will form an alloy with the liquefied surface of the ground metal piece, but by far the greater part of the carbide mass after this melting operation forms a homogeneous layer of metal carbides which is completely welded together with this lower alloyed layer.

In order to give the metal carbides the shortest possible time for decomposition and alloying with the ground metal therebelow, the carbide mass has to be melted down as quickly as possible by a flame of the highest possible temperature. The so-called atomic hydrogen flame which has a temperature of 3200 to 3500 degrees C. and produces an entirely neutral atmosphere has given particularly satisfactory results in carrying out the process, but any other carbon or metal arc can be made use of provided the necessary precautions are taken. The flux is added in order to protect the surface of the ground metal piece from oxidation because of the fact that due to its lower melting point the ground metal melts somewhat earlier than the metal carbides. This protection results in a homogeneous connection of the metal carbides to the ground metal.

Furthermore, particularly favorable welding conditions are obtained by nitriding the metal carbides of high melting point before welding them onto the ground metal. In this manner nitrides are formed in part which, without reducing the cutting hardness of the material, notably lower its melting point and viscosity, whereby a better welding melt is obtained.

Furthermore, it has been proved advantageous to employ as metal carbide powder to be welded onto the ground metal, carbides that previously have been sintered and disintegrated again. In this manner the oxidation of a portion of the carbide powder during welding is avoided.

Finally, it comes within the scope of my invention to place sintered metal carbide pieces like islands in the superficially liquefied ground metal and to fill with the molten carbide only the spaces existing between these pieces.

As will be seen from the foregoing my invention affords the possibility of welding in sufficiently thick layers cutting metal built up on the basis of the carbides of the tungsten group, onto tools having large and complicated working surfaces and to enlarge thus the field of use of these cutting metals.

The process according to my invention affords the further advantage of high economy as it is possible to apply very thin layers only, and as the waste material always remaining in the manufacture of sintered bodies from metal carbides of high melting point can be utilized very satisfactorily.

Tools manufactured according to the process described have a surface of a very low brittleness but of an extraordinarily high resistance to wear, so that these tools when compared with those armored with high speed turning steel or similar alloys afford remarkable advantages when used for instance for pressing and drawing metal, for earth-boring work and the like, where the tools are exposed to both heavy wear and violent shocks.

I am aware that it is already known to weld electrothermically, or autothermically, onto tools, alloys and high speed steels having a melting point of about 1300 to 1400 degrees C., no process, however, has been proposed hitherto making it possible to homogeneously and inseparably apply on tools or machinery parts layers of any desired thickness of metal carbides of high melting point such as tungsten carbides which have a melting point of about 2600 degrees C.

What I claim and desire to secure by Letters Patent is:—

1. The process of manufacturing articles having a hard surface layer, comprising preparing a powdered mass of metal carbides of high melting point, subjecting said mass to a nitriding operation, and melting it onto a ground metal piece.

2. The process of manufacturing articles having a hard surface layer, comprising preparing metal carbides of high melting point, sintering them and forming therefrom both coarse pieces and powder, applying said coarse pieces spacedly to a ground metal piece and melting said powder onto the latter on the interstitial spaces.

3. The process of manufacturing articles having a hard surface layer, comprising preparing metal carbides of high melting point, sintering them and forming therefrom both coarse pieces and powder, preparing a ground metal piece and melting it superficially, melting said coarse pieces spacedly into this molten surface and melting said powder onto it on the interstitial spaces.

4. The process of manufacturing articles having a hard surface layer, comprising preparing metal carbides of high melting point, sintering them and forming therefrom both coarse pieces and powder, preparing a ground metal piece and melting it superficially, melting said coarse pieces spacedly into this molten surface and melting said powder onto it in the interstitial spaces, this latter melting operation being executed by means of an arc having the properties of the atomic hydrogen flame.

5. The process of manufacturing articles having a hard surface layer, comprising preparing metal carbides of high melting point, sintering them and forming therefrom both coarse pieces and powder, preparing a ground metal piece and melting it superficially, melting said coarse pieces spacedly into this molten surface and melting said powder onto it in the interstitial spaces, this latter melting operation being executed by means of an arc having the properties of the atomic hydrogen flame and with an addition of a flux.

6. The process of manufacturing articles having a hard surface layer, comprising preparing metal carbides of high melting point, sintering them and forming therefrom both coarse pieces and powder, preparing a ground metal piece and melting it superficially, melting said coarse pieces spacedly into this molten surface and melting said powder onto it in the interstitial spaces, this latter melting operation being executed by means of an arc having the properties of the atomic hydrogen flame and with addition of calcium fluoride.

7. The process of manufacturing articles composed of a ground metal and a hard surface layer thereon, which comprises preparing a finely powdered mass of a hard metallic composition composed principally of a carbide of a metal of high melting point, spreading said mass upon the surface of the ground metal, and rapidly melting said powdered mass by applying to it a temperature of at least 3000° C. to form a surface layer of said hard metallic composition consisting of an outer zone of homogeneous hard metallic composition substantially unalloyed with the ground metal and an inner zone welding said layer to the ground metal.

8. The process of manufacturing articles composed of a ground metal and a hard surface layer thereon, which comprises sintering together a carbide of a metal of high melting point and an auxiliary metal of lower melting point to form a hard metallic composition, finely powdering the sintered mass, spreading said mass upon the surface of the ground metal, and rapidly melting said powdered mass by applying to it a temperature of at least 3000° C. to form a surface layer of said hard metallic composition consisting of an outer zone of homogeneous hard metallic composition substantially unalloyed with the ground metal and an inner zone welding said layer to the ground metal.

9. A process as defined in claim 7, wherein said powdered mass is melted onto the ground metal in the presence of a flux of calcium fluoride.

ERNST AMMANN.